United States Patent [19]

Kato et al.

[11] Patent Number: 5,156,228

[45] Date of Patent: Oct. 20, 1992

[54] FRONT WHEEL STEERING APPARATUS

[75] Inventors: Kiyotaka Kato, Nishio; Shiro Takeuchi, Toyota, both of Japan

[73] Assignee: Toyoda Koki Kabushiki Kaisha, Kariya, Japan

[21] Appl. No.: 648,298

[22] Filed: Jan. 31, 1991

[30] Foreign Application Priority Data

Jan. 31, 1990 [JP] Japan .................................. 2-21410

[51] Int. Cl.$^5$ .............................................. B62D 3/00
[52] U.S. Cl. .................................. 180/132; 180/149
[58] Field of Search ............... 180/141, 142, 143, 148, 180/149, 132; 91/375 A

[56] References Cited

U.S. PATENT DOCUMENTS 4,195,706  4/1980  Konishi ............................... 180/132

FOREIGN PATENT DOCUMENTS 3720150  12/1987  Fed. Rep. of Germany ...... 180/148

*Primary Examiner*—Mitchell J. Hill
*Attorney, Agent, or Firm*—Oblon, Spivak, McClelland, Maier & Neustadt

[57] ABSTRACT

In a front wheel steering apparatus including an input shaft arranged to be rotated by the driver's steering effort applied thereto, an output member operatively connected to a set of steerable front road wheels by use of a steering linkage and an interconnecting mechanism for operatively interconnecting the input shaft to the output member, an axial projection is provided on an input end of the input shaft in parallel with the rotation axis of the input shaft and at a position radially displaced a predetermined distance from the rotational axis of the input shaft, a cam follower is rotatably mounted on the axial projection, and a cam shaft is arranged in parallel with the input shaft to be applied with the steering effort for effecting rotation of the input shaft. The cam shaft has a flange portion formed with a radial cam groove for engagement with the cam follower, and the rotational axis of the cam shaft is located at a position radially displaced a smaller distance from the rotational axis of the input shaft smaller distance than the predetermined distance between the rotation axis of the input shaft and the axial projection.

6 Claims, 2 Drawing Sheets

FRONT WHEEL STEERING APPARATUS

BACKGROUND OF THE INVENTION

Field of the Invention

The present invention relates to a front wheel steering apparatus operable in response to the driver's steering effort applied thereto to steer a set of steerable front road wheels in a wheeled vehicle.

Description of the Prior Art

In general, a conventional front wheel steering apparatus of this kind includes an input shaft arranged to be rotated by the driver's steering effort applied thereto, an output member operatively connected to a set of steerable front road wheels by means of a steering linkage, and an interconnecting mechanism in the form of a rack and pinion mechanism, a ball screw mechanism or the like for operatively interconnecting the input shaft to the output member. In the interconnecting mechanism, however, a displacement stroke ratio of the output member relative to a rotation angle of the steering wheel is constant as shown by a broken line in FIG. 3. For this reason, the driver's feel in steering operation becomes insufficient when the steering wheel is steered at a large angle from a neutral position, and a maximum rotation angle of the steering wheel necessary for steering the front road wheels at a desired maximum angle becomes larger (for example, 540 degrees). In the case that the displacement stroke ratio of the output member is increased to overcome the above problem, the driver's feel in steering operation becomes excessive at an initial stage adjacent the neutral position of the steering wheel.

SUMMARY OF THE INVENTION

It is, therefore, a primary object of the present invention to provide a front wheel steering apparatus capable of overcoming the problems discussed above.

According to the present invention, the object is attained by providing a front wheel steering apparatus operable in response to the driver's steering effort applied thereto to steer a set of steerable front road wheels, including an input shaft arranged to be rotated by the steering effort, an output member operatively connected to the front road wheels by means of a steering linkage and an interconnecting mechanism for operatively interconnecting the input shaft to the output member, which steering apparatus comprises an axial projection provided on an input end of the input shaft in parallel with the rotation axis of the input shaft and located at a position radially displaced a predetermined distance from the rotational axis of the input shaft, a cam follower rotatably mounted on the axial projection, and a cam shaft arranged in parallel with the input shaft to which the steering effort is applied for effecting rotation of the input shaft and having a flange portion formed with a radial cam groove for engagement with the cam follower, the rotational axis of the cam shaft being located at a position radially displaced from the rotational axis of the input shaft a smaller distance than the predetermined distance between the rotational axis of the input shaft and the axial projection.

In a practical embodiment of the present invention, the axial projection is integrally formed on a tubular shaft mounted on the input end of the input shaft for rotation therewith, and the cam follower is in the form of a roller rotatably mounted on a support pin coaxially fixed to the axial projection.

BRIEF DESCRIPTION OF THE DRAWINGS

Other objects, features and advantages of the present invention will be more readily appreciated from the following detailed description of a preferred embodiment thereof when taken together with the accompanying drawings, in which.

DESCRIPTION OF THE PREFERRED EMBODIMENTS

Figure 1:
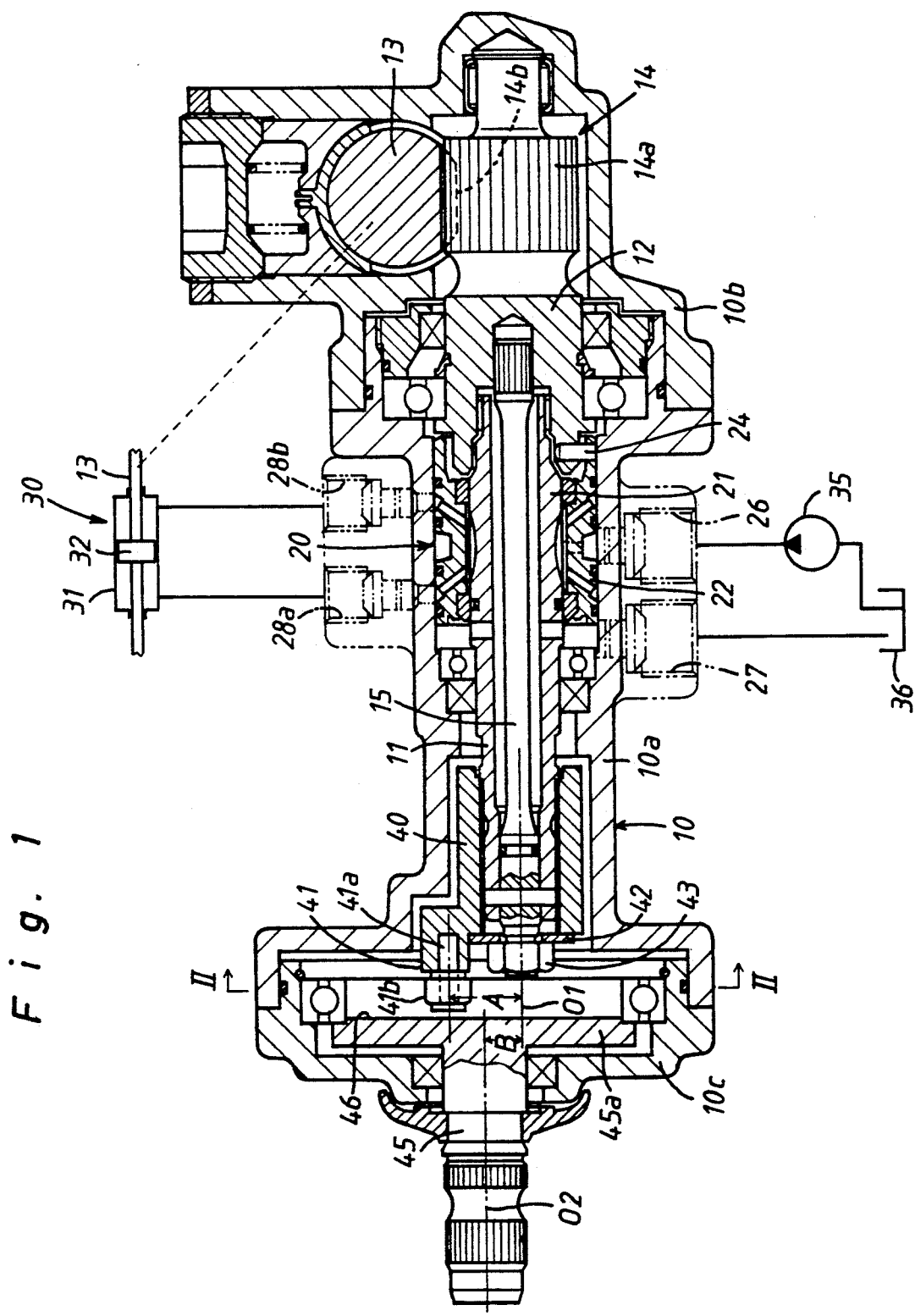
FIG. 1 is a sectional view of a front wheel steering apparatus in accordance with the present invention.

In FIG. 1 of the drawings, there is illustrated a front wheel steering apparatus the housing assembly 10 of which includes a valve housing 10a, a rack housing 10b and a cam housing 10c fastened to one another by means of bolts. Input and output shafts 11 and 12 are arranged coaxially to one another and mounted rotatably within the valve housing 10a and rack housing 10b, respectively. The input and output shafts 11 and 12 are interconnected by means of a torsion bar 15 for relative rotation. A lateral rack bar 13 is arranged orthogonally to the output shaft 12 and supported axially movably on the rack housing 10b. The output shaft 12 is operatively connected to the rack bar 13 by means of an interconnecting mechanism 14 which includes a pinion 14a integrally provided on the lower end portion of output shaft 12 and being in meshing engagement with the toothed portion 14b of rack bar 13. The rack bar 13 has opposite ends operatively connected to a set of steerable front road wheels (not shown) by means of a steering linkage (not shown).

The front wheel steering apparatus is provided therein with a rotary valve assembly 20 for control of a hydraulic power cylinder 30. The rotary valve assembly 20 includes a valve rotor 21 integrally formed on the input shaft 11 and a valve sleeve 22 rotatably coupled within an internal bore of valve housing 10a in surrounding relationship with the valve rotor 21 and connected to the output shaft 12 by means of a radial pin 24. The valve housing 10a has an inlet port 26, an exhaust port 27 and a pair of distribution ports 28a, 28b. The hydraulic power cylinder 30 includes a cylinder housing 31 in which the rack bar 13 is axially movably mounted in a liquid-tight manner and a piston 32 is fixed to the rack bar 13 and coupled within the cylinder housing 31 to subdivide the interior of cylinder housing 31 into a pair of opposite fluid chambers. The rotary valve assembly 20 is connected at its distribution ports 28a, 28b to the fluid chambers of cylinder housing 31 and connected at its inlet and exhaust ports 26 and 27, respectively, to a hydraulic pump 35 and a fluid reservoir 36. The rotary valve 20 is operated in response to relative rotation of the input and output shafts 11 and 12 to control the supply of hydraulic fluid under pressure from the hydraulic pump 35 into one of the fluid chambers of cylinder housing 31 and discharge of the hydraulic fluid from the other fluid chamber of cylinder housing 31 into the fluid reservoir 36. Under control of the rotary valve 20, the power cylinder 30 is activated to apply a hydraulic assist force to the front road wheels through rack bar 13 in accordance with the steering torque applied to input shaft 11.

Figure 2:
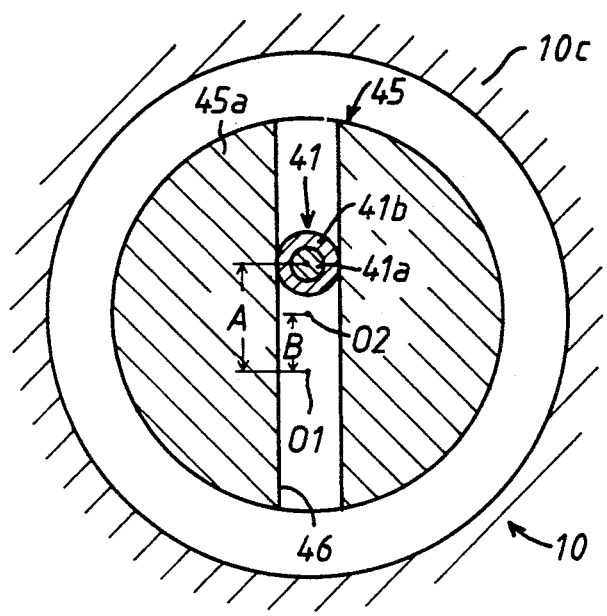
FIG. 2 is a cross-sectional view taken along line II—II in FIG. 1.

As will be described hereinafter, the input shaft 11 is operatively connected to a steering shaft (not shown) for connection to a steering wheel (not shown). A tubular pin shaft 40 is mounted on an input end portion of input shaft 11 for rotation therewith and fixed in place by means of a fastening nut 43 threaded over the input end of input shaft 11 through a washer 42. The pin shaft 40 has an axial projection 41 located at a position radially displaced in a predetermined distance A from the rotation axis 01 of input shaft 11. A support pin 41a is threaded into the axial projection 41 and arranged in parallel with the rotation axis 01 of input shaft 11. A cam follower roller 41b is rotatably carried by the support pin 41a. The cam housing 10c is formed to rotatably support a cam shaft 45 mounted therein. The rotation axis 02 of cam shaft 45 is arranged in parallel with the rotation axis 01 of input shaft 11 and located at a position radially displaced from the rotation axis 01 of input shaft 11 in a smaller distance B than the distance A. As shown in FIGS. 1 and 2, the am shaft 45 has a circular flange portion 45a formed with a radial cam groove 46 for engagement with the cam follower roller 41b. The cam shaft 45 is operatively connected to the steering shaft to be rotated by the driver's steering effort applied to the steering wheel.

In operation, the cam shaft 45 is rotated by the driver's steering effort applied thereto from the steering wheel to rotate the input shaft 11 through the pin shaft 40. During the condition where the steering wheel is retained in a neutral position, the rotation axis 01, 02 of input shaft 11 and cam shaft 45 are aligned with the rotation axis of roller 41b on a common plane as shown in FIG. 2. When the cam shaft 45 is rotated in a rightward or leftward direction, the cam follower roller 41b rotates radially outwardly along the cam groove 46 to increase the angle of the rotation axis of roller 41b relative to the common plane between the rotation axis 01 and 02 of input shaft 11 and cam shaft 45. As a result, the rotational angle ratio of input shaft 11 relative to cam shaft 45 is increased in accordance with rotation of the steering wheel. Such a rotational characteristic of input shaft 11 can be adjusted by variation of the distances A and B.

Figure 3:
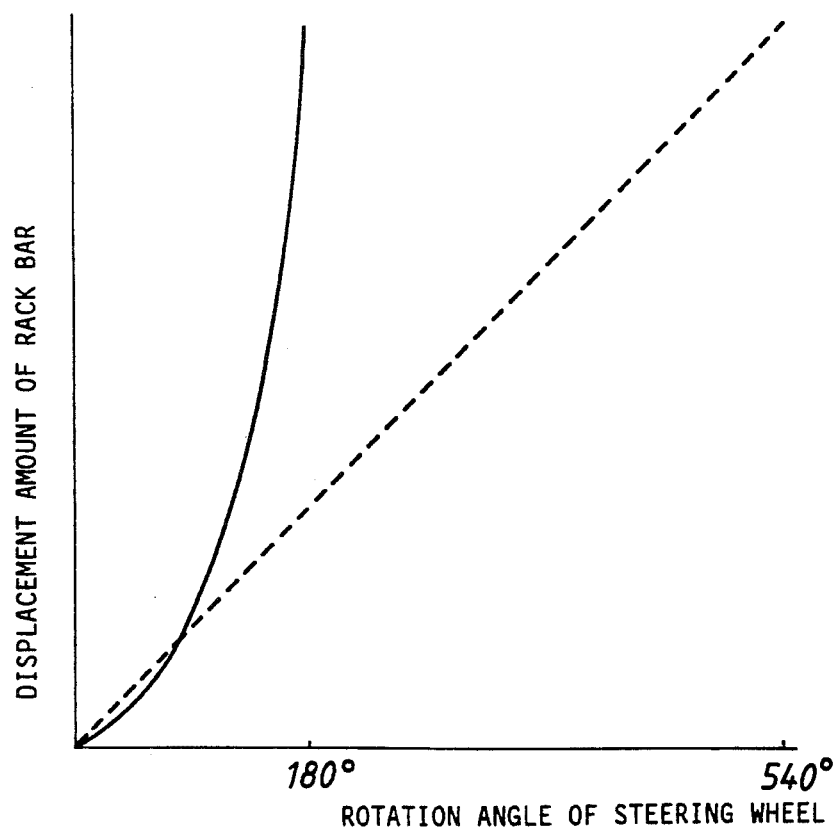
FIG. 3 is a graph illustrating a displacement amount of a rack bar in relation to a rotational angle of a steering wheel.

The rotation of input shaft 11 is transmitted to the output shaft 12 through the torsion bar 15 and is converted into an axial displacement of rack bar 13 at the interconnecting mechanism 14. Thus, as shown by a solid curve in FIG. 3, the axial displacement stroke of rack bar 13 relative to the rotational angle of the steering wheel is gradually increased at an initial stage adjacent the neutral position and is rapidly increased in accordance with an increase of the rotation angle of the steering wheel. Similarly, the steering angle ratio of the front road wheels relative to the rotation angle of the steering wheel is non-linearly increased in accordance with the increase of the rotation angle of the steering wheel. As a result, the driver's feel in steering operation can be sufficiently obtained without causing any insufficient feel in steering operation at the initial stage adjacent the neutral position. Since the axial displacement stroke ratio of rack bar 13 relative to the rotation angle of pinion 14a is made larger than that in a conventional front steering apparatus of this kind, the maximum rotational angle of the steering wheel necessary for steering the front road wheels at a desired maximum angle can be made smaller than that in a conventional front steering apparatus. In such operation of the steering wheel as described above, the rotary valve 20 is operated in response to relative rotation of the input and output shafts 11 and 12 to activate the power cylinder 30 for applying a hydraulic assist force to the front road wheels through the rack bar 13. The present invention, however, may be adapted to a front wheel steering apparatus without the power-assisted mechanism.

In the above embodiment, the cam mechanism is disposed between the steering shaft and the input shaft 11. Therefore, in the apparatus, the manual steering torque required to twist the torsion bar changes depending on the rotational angle of the steering wheel, i.e., the manual steering torque is relatively small at an initial stage adjacent the neutral position but is gradually increased in accordance with an increase in the rotational angle of the steering wheel.

FIG. 4 shows a second embodiment which can overcome the above noted problem, in which the cam mechanism is disposed between a valve assembly 20' and the interconnection mechanism 14'. Namely, a circular cam member 50 having a radial cam groove 51 is received within a housing 10' in a coaxial relationship with an output shaft 12', and rotation of the output shaft 12' is transmitted to the cam member 50 through a key 50a. Further, a pinion shaft 52 is carried in the housing 10', as an input member, for rotation about an axis 03, which is offset a predetermined distance B' from the rotational axis of the output shaft 12'. The pinion shaft 52 is formed with a pinion gear 52a which is meshed with the rack shaft 13', and a support ring 54 is attached to the input end of the pinion shaft 52 for rotation therewith. A support pin 55 is threaded into the support ring 54 at a position radially displaced a predetermined distance A' from the rotational axis 03 of the pinion shaft 52 so as to rotatably support a follower roller 56 which is engaged with the cam groove 51. Numeral 57 is a backup roller supported by a cylindrical member 58 which is urged by a spring to move toward the rack bar 13'. In the second embodiment, the maximum rotational angle of the steering wheel is ±240 degrees.

When the output shaft 12' is rotated, the rotation of the output shaft 12' is transmitted to the pinion shaft 52 through above-explained cam mechanism, whereby the rotational angle ratio of the pinion shaft 52 relative to the output shaft 12' is increased in accordance with rotation of the steering wheel. In the second embodiment, manual steering torque required to twist the torsion bar 15' does not change depending on the rotational angle, because the steering wheel is connected directly to the valve assembly 20'. Therefore, it is possible to give a constant steering feeling to a driver regardless of change in the steering angle.

Other structure shown in FIG. 4 similar to that of FIG. 1 is a hydraulic pump 35', a reservoir 36', an input shaft 11' and a hydraulic power cylinder 30' which includes a cylinder housing 31' and a piston 32'.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A front wheel steering apparatus operable in response to the driver's steering effort applied thereto to steer a set of steerable front road wheels, including an input member arranged to be rotated by the steering effort, an output member operatively connected to the front road wheels by means of a steering linkage and an interconnecting mechanism for operatively interconnecting said input member to said output member, said steering apparatus comprising:

an axial projection provided on an input end of said input member in parallel with the rotational axis of said input member and located at a position radially displaced a predetermined distance from the rotation axis of said input member;

a cam follower rotatably mounted on said axial projection; and a cam member arranged in parallel with said input member and to which is applied the steering effort for effecting rotation of the input member and having a flange portion formed with a radial cam groove for engagement with the cam follower, the rotational axis of said cam member being located at a position radially displaced from the rotational axis of said input member by a smaller distance than the predetermined distance between the rotational axis of said input member and said axial projection.

2. A front wheel steering apparatus as claimed in claim 1, wherein said axial projection is integrally formed on a tubular shaft mounted on the input end of an input shaft constituting said input member for rotation therewith and wherein said cam follower comprises a roller rotatably mounted on a support pin coaxially fixed to said axial projection.

3. A front wheel steering apparatus as claimed in claim 2, wherein an output shaft is arranged coaxially with said input shaft and interconnected with said input shaft by means of a torsion bar for relative rotation thereto, said output shaft being drivingly connected to said output member by means of said interconnecting mechanism.

4. A front wheel steering mechanism as claimed in claim 3, further comprising a hydraulic power cylinder for applying a hydraulic assist force to said output member when activated and a rotary valve provided on said input shaft to be operated in response to relative rotation of said input and output shafts for controlling a supply of hydraulic fluid under pressure from a source of hydraulic pressure into one of opposite fluid chambers of said power cylinder and discharge of the hydraulic fluid from the other fluid chamber of said power cylinder into a fluid reservoir.

5. A front wheel steering apparatus as claimed in claim 1, wherein said input member includes a pinion shaft formed with a pinion gear thereon, said output member comprises a rack bar meshed with said pinion gear, and said axial projection is a supporting pin arranged at an inner end of said pinion shaft for rotation therewith.

6. A front wheel steering apparatus as claimed in claim 5, further comprising an input shaft which is arranged coaxially with said cam member and interconnected with said cam member by means of a torsion bar for relative rotation thereto, a hydraulic power cylinder for applying a hydraulic assistance force to said rack bar when activated, and a rotary valve provided between said input shaft and said cam member for controlling a supply of hydraulic fluid under pressure from a source of hydraulic pressure into one of opposite fluid chambers of said power cylinder and discharge of the hydraulic fluid from the other fluid chamber of said power cylinder into a fluid reservoir.

* * * * *